(12) United States Patent
Horigome et al.

(10) Patent No.: US 11,820,064 B2
(45) Date of Patent: *Nov. 21, 2023

(54) INJECTION MOLDING UNIT AND BLOW MOLDING MACHINE INCLUDING SAME

(71) Applicant: NISSEI ASB MACHINE CO., LTD., Nagano (JP)

(72) Inventors: Hiroshi Horigome, Nagano (JP); Tsuyoshi Takahashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 91 days.

This patent is subject to a terminal disclaimer.

(21) Appl. No.: 17/376,847

(22) Filed: Jul. 15, 2021

(65) Prior Publication Data

US 2021/0339453 A1    Nov. 4, 2021

Related U.S. Application Data

(62) Division of application No. 16/313,364, filed as application No. PCT/JP2017/023506 on Jun. 27, 2017, now Pat. No. 11,130,272.

(30) Foreign Application Priority Data

Jun. 27, 2016 (JP) .................................. 2016-127010

(51) Int. Cl.
  *B29C 49/06*  (2006.01)
  *B29C 49/36*  (2006.01)
  (Continued)

(52) U.S. Cl.
  CPC .............. *B29C 49/06* (2013.01); *B29C 45/06* (2013.01); *B29C 45/1773* (2013.01);
  (Continued)

(58) Field of Classification Search
  CPC ....... B29C 49/06; B29C 49/062; B29C 49/36; B29C 45/1773
  See application file for complete search history.

(56) References Cited

U.S. PATENT DOCUMENTS 3,632,267 A    1/1972    Kader
5,253,999 A    10/1993   Kosuge
          (Continued)

FOREIGN PATENT DOCUMENTS

CN    201206711    3/2009
CN    101454141    6/2009
          (Continued)

OTHER PUBLICATIONS

Chinese Office Action in counterpart CN Application No. 201780040016.7, dated Jul. 21, 2021, along with English translation thereof.

(Continued)

*Primary Examiner* — Robert B Davis
(74) *Attorney, Agent, or Firm* — Greenblum & Bernstein, P.L.C.

(57) ABSTRACT

Provided is a blow molding machine including an injection molding unit and a blow molding unit, wherein the injection molding unit includes a preform mold and an injection device configured to supply resin to the preform mold, wherein the injection device is fixed to a support plate, and wherein the support plate includes a position adjustment mechanism capable of adjusting a position of the injection device in an upper and lower direction with respect to the preform mold.

2 Claims, 12 Drawing Sheets

(51) Int. Cl.
  *B29C 45/17* (2006.01)
  *B29C 45/06* (2006.01)
  *B29K 67/00* (2006.01)
  *B29L 31/00* (2006.01)

(52) U.S. Cl.
  CPC ........ *B29C 49/36* (2013.01); *B29K 2067/003* (2013.01); *B29L 2031/7158* (2013.01)

(56) References Cited

U.S. PATENT DOCUMENTS

| | | | |
|---|---|---|---|
| 5,582,851 A | 12/1996 | Hofstetter et al. | |
| 2008/0014299 A1* | 1/2008 | Amano | B29C 45/2701 425/549 |
| 2009/0274789 A1 | 11/2009 | Kobayashi et al. | |
| 2019/0152121 A1 | 5/2019 | Horigome et al. | |

FOREIGN PATENT DOCUMENTS

| | | | | |
|---|---|---|---|---|
| CN | 201511518 | 6/2010 | | |
| CN | 102838051 | 12/2012 | | |
| CN | 103354780 | 10/2013 | | |
| CN | 203305464 | 11/2013 | | |
| CN | 204431711 | 7/2015 | | |
| CN | 105417451 | 3/2016 | | |
| DE | 2060346 A * | 6/1971 | ......... | B29C 45/1773 |
| GB | 1258187 | 12/1971 | | |
| JP | 47-10233 | 3/1972 | | |
| JP | 03042219 A * | 2/1991 | ......... | B29C 45/1773 |
| JP | 7-164512 | 6/1995 | | |
| JP | 8-2586 | 1/1996 | | |
| JP | 11-28761 | 2/1999 | | |

OTHER PUBLICATIONS

《机械设计》宗望远等 华中科技大学出版社 pp. 258-259, dated Aug. 31, 2015, and English translation thereof.
Office Action dated Apr. 20, 2020 in Chinese patent application No. 201780040016.7 and English translation thereof.
Office Action dated Apr. 28, 2020 in Indian patent application No. 201817048949 and English translation thereof.
Extended European Search Report dated Jan. 28, 2020 in EP 17820129.9.
International Search Report issued in International Patent Application No. PT/JP2017/023506, dated Sep. 12, 2017, and English translation thereof.
Written Opinion in International Patent Application No. PCT/JP2017/023506, dated Sep. 12, 2017.
English translation of CN203305464.

* cited by examiner

FIG. 12

INJECTION MOLDING UNIT AND BLOW MOLDING MACHINE INCLUDING SAME

CROSS REFERENCE TO RELATED APPLICATION

This application is a Divisional Application of U.S. application Ser. No. 16/313,364, filed Dec. 26, 2018, which is a § 371 national stage entry of International Patent Application No. PCT/JP2017/023506, filed Jun. 27, 2017, which claims priority to Japanese Patent Application No. 2016-127010 filed Jun. 27, 2016. The entire disclosure and contents of each of these applications are hereby incorporated by reference herein in their entirety.

TECHNICAL FIELD

The disclosure relates to an injection molding unit and a blow molding machine including the same.

BACKGROUND ART

Recently, a rotary type blow molding machine in which an injection-molded preform is intermittently transferred by a transfer plate and is blow-molded into a PET bottle or the like is known (e.g., see Patent Document 1). In an injection molding unit of such a rotary type blow molding machine, the transfer plate and a neck mold are moved downward with respect to a cavity mold by a downward movement of a core mold to perform the mold clamping.

CITATION LIST

Patent Document

Patent Document 1: JP-A-H08-2586

DISCLOSURE OF INVENTION

Problems to be Solved by Invention

In the blow molding machine of Patent Document 1, various shapes of performs and containers can be manufactured by changing a mold.

However, in the rotary type blow molding machine, the molding cycle may be degraded due to changing the mold.

The disclosure aims to provide an injection molding unit capable of suppressing the degradation of the molding cycle due to changing the mold and a blow molding machine including the same.

Means for Solving the Problems

In order to achieve the above object, a blow molding machine of the disclosure includes:
an injection molding unit configured to manufacture a bottomed preform made of resin; and
a blow molding unit configured to manufacture a container by blow-molding the preform manufactured by the injection molding unit,
wherein the injection molding unit includes:
   a mold configured to manufacture the preform; and
   an injection device configured to supply resin which is a raw material to the mold,
wherein the injection device is fixed to a support plate, and
wherein the support plate has a position adjustment mechanism capable of adjusting a position of the injection device in an upper and lower direction with respect to the mold.

When changing a mold for a preform, in the mold, it is necessary to adjust heights of a resin injection hole of a hot runner block and a nozzle of an injection device for discharging resin. Therefore, conventionally, a large-scale work such as lifting an injection device with a crane or the like and inserting a spacer under the injection device is required. However, according to the above configuration, the position of the injection device in the upper and lower direction can be easily adjusted by the position adjustment mechanism. Therefore, the heights of the hole of the hot runner block and the nozzle of the injection device can be adjusted by adjusting the position of the injection device in the upper and lower direction according to the change of the mold. In this way, it is possible to drastically reduce the labor and time involved in changeover when molding the different types of preforms.

Further, in the blow molding machine of the disclosure, the position adjustment mechanism may include:
   a machine table;
   a lifting and lowering mechanism configured to lift and lower the support plate with respect to the machine table;
   a locking block fixed to the support plate and having locking recesses formed in a plurality of stages in the upper and lower direction and extending in a horizontal direction; and
   a locking plate provided to the machine table and configured to be locked into and unlocked from any one of the locking recesses by being slid in a direction approaching and separating from the locking block.

According to the blow molding machine having such a configuration, the position of the injection device in the upper and lower direction can be adjusted in a step-by-step manner by lifting and lowering the support plate to which the injection device is fixed by the lifting and lowering mechanism and selectively fitting the locking plate to any one of the locking recesses of the locking block. In this way, the operation of adjusting the heights of the injection device and the mold for the preform can be easily performed.

Further, in the blow molding machine of the disclosure, the blow molding machine may include:
   a plurality of processing units including at least the injection molding unit and the blow molding unit, the plurality of processing units being arranged at a predetermined angular interval in the horizontal direction on the machine table;
   a plurality of transfer plates arranged at a predetermined angular interval in the horizontal direction above the machine table;
   a neck mold provided to the transfer plate and capable of gripping a preform molded by the injection molding unit; and
   a transport mechanism configured to lift and lower the transfer plates in the processing units and intermittently rotate the transfer plates at a predetermined angular interval in the horizontal direction, and
the preform molded by the injection molding unit may be pulled up from a cavity mold configuring the mold according to the lifting of the transfer plate by the transport mechanism and may be sequentially transported to the processing units according to the intermittent rotation of the transfer plate at the predetermined angular interval in the horizontal direction by the transport mechanism.

According to the blow molding machine having such a configuration, the preform molded by the injection molding unit can be pulled up from the cavity mold by lifting the transfer plate by the transport mechanism, the transfer plate can be intermittently rotated at the predetermined angular interval in the horizontal direction, and each processing in the processing units can be performed. Here, in the blow molding machine in which the transfer plate is intermittently rotated in the horizontal direction and the preform is processed in each of the processing units, conventionally, there are cases where the stroke of the transfer plate with respect to the cavity mold at the time of changing the mold is unnecessarily large, and thus, the molding cycle is degraded. That is, although the distance of the stroke of the transfer plate is sufficient as long as the preform can be extracted from the cavity mold and moved in a rotation direction, since the constraint on the positioning of the connection position between the nozzle of the injection device and the mold is preferentially considered, the adjustment of the stroke of the transfer plate is sacrificed.

However, according to the above configuration, the stroke of the transfer plate with respect to the cavity mold can be optimally set for each mold, so that the degradation in the molding cycle can be suppressed.

Further, an injection molding unit of the disclosure is an injection molding unit for molding a preform by supplying resin which is a raw material to a mold for manufacturing a bottomed preform made of resin, the injection molding unit including:

an injection device configured to supply the resin which is the raw material to the mold;

a support plate having an upper surface to which the injection device is fixed; and a position adjustment mechanism provided to the support plate and capable of adjusting a position of the injection device in an upper and lower direction with respect to the mold.

According to the injection molding unit having such a configuration, the position of the injection device in the upper and lower direction can be easily adjusted by the position adjustment mechanism. Therefore, in the mold, the heights of the resin injection hole of the hot runner block and the nozzle of the injection device for discharging resin can be adjusted by adjusting the position of the injection device in the upper and lower direction according to the change of the mold. In this way, it is possible to drastically reduce the labor and time involved in changeover when molding the different types of preforms.

Further, in the injection molding unit of the disclosure, the injection molding unit may include a height fine-adjustment mechanism capable of adjusting the position of the injection device in the upper and lower direction with respect to the support plate, the height fine-adjustment mechanism being provided between the support plate and the injection device.

According to the injection device having such a configuration, the position of the injection device in the upper and lower direction can be roughly adjusted by the position adjustment mechanism, and then, the position of the injection device in the upper and lower direction can be finely adjusted by the height fine-adjustment mechanism. In this way, the heights of the hole of the hot runner block and the nozzle of the injection device can be adjusted with high accuracy.

Effects of Invention

According to the disclosure, it is possible to provide an injection molding unit capable of suppressing the degradation of the molding cycle due to changing the mold and a blow molding machine including the same.

EMBODIMENT FOR CARRYING OUT INVENTION

Hereinafter, an example of the present embodiment will be described with reference to the drawings.

Figure 1:
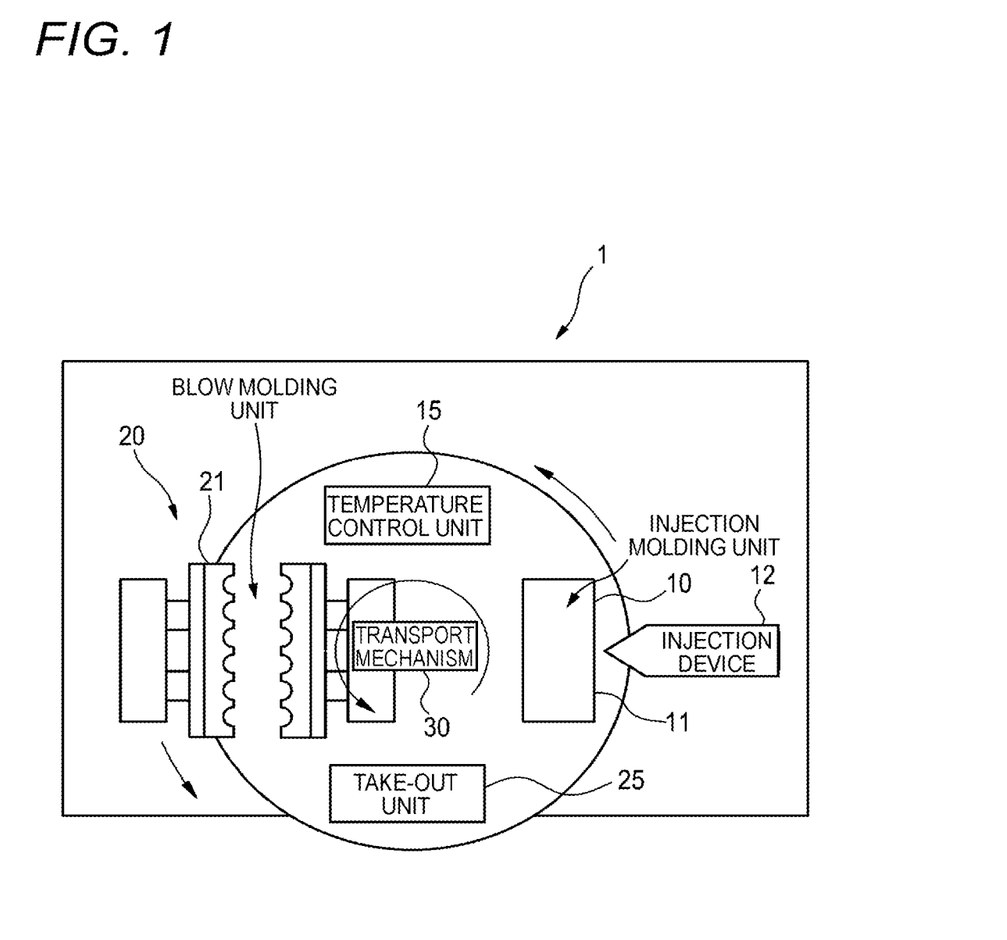
FIG. 1 is a schematic configuration view of a blow molding machine according to the present embodiment.

As shown in FIG. 1, a blow molding machine 1 according to the present embodiment includes an injection molding unit 10 for manufacturing a preform and a temperature control unit 15 for adjusting the temperature of the manufactured preform. The injection molding unit 10 includes an injection device 12 for supplying resin which is a raw material of a container. Further, the blow molding machine 1 includes a blow molding unit 20 for blowing a preform to manufacture a container and a take-out unit 25 for taking out the manufactured container. In this manner, the blow molding machine 1 has a one-stage configuration as a whole.

The injection molding unit 10, the temperature control unit 15, the blow molding unit 20, and the take-out unit 25 are provided at positions rotated by a predetermined angle (90 degrees in this example) in a horizontal direction around a transport mechanism 30. The transport mechanism 30 includes the same number of transfer plates 40 (to be described later) as the processing units including the injection molding unit 10, the temperature control unit 15, the blow molding unit 20, and the take-out unit 25. The transport mechanism 30 intermittently rotates the transfer plates 40 at predetermined angular intervals in a horizontal plane and places the transfer plates 40 at each processing unit. In this example, the transfer plate 40 is formed of four fan-shaped boards and is configured to be lifted and lowered in a state of being placed at the positions of the injection molding unit 10 and the blow molding unit 20 by the transport mechanism 30.

The injection molding unit 10 includes a preform mold 11 and the injection device 12. By supplying resin material from the injection device 12 to the preform mold 11, a bottomed cylindrical preform is manufactured.

The temperature control unit 15 is configured to perform temperature adjustment for bringing the temperature of the preform manufactured by the injection molding unit 10 close to an even temperature distribution over the entire preform. Further, the temperature control unit 15 is configured to adjust the temperature of the preform to a suitable temperature (e.g., 90° C. to 100° C.) for stretch-blowing the preform. For example, the preform is placed in a temperature-controlled pot, and the blow pressure is introduced in the temperature-controlled pot via a temperature-controlled blow core mold fitted into a mouth portion of the preform. The preform is pre-blown by the introduced blow pressure and brought into contact with the inner surface of the temperature-controlled pot, so that the preform is adjusted to an optimum blow temperature. Further, the temperature of the preform may be adjusted in a non-contact state by the heat generated from the temperature-controlled (heating) blow core mold or the temperature-controlled (heating) pot without performing the pre-blowing.

The blow molding unit 20 is configured to manufacture a container made of resin by performing, for example, heat-treatment blowing and final blowing on the preform whose temperature has been adjusted by the temperature control unit 15 by a mold unit 21 made of split molds.

The take-out unit 25 is configured to release a neck portion of the container manufactured by the blow molding unit 20 from a neck mold 41 (to be described later) and take out the container to the outside of the blow molding machine 1.

Subsequently, the injection molding unit 10 will be described in detail.

Figure 2:
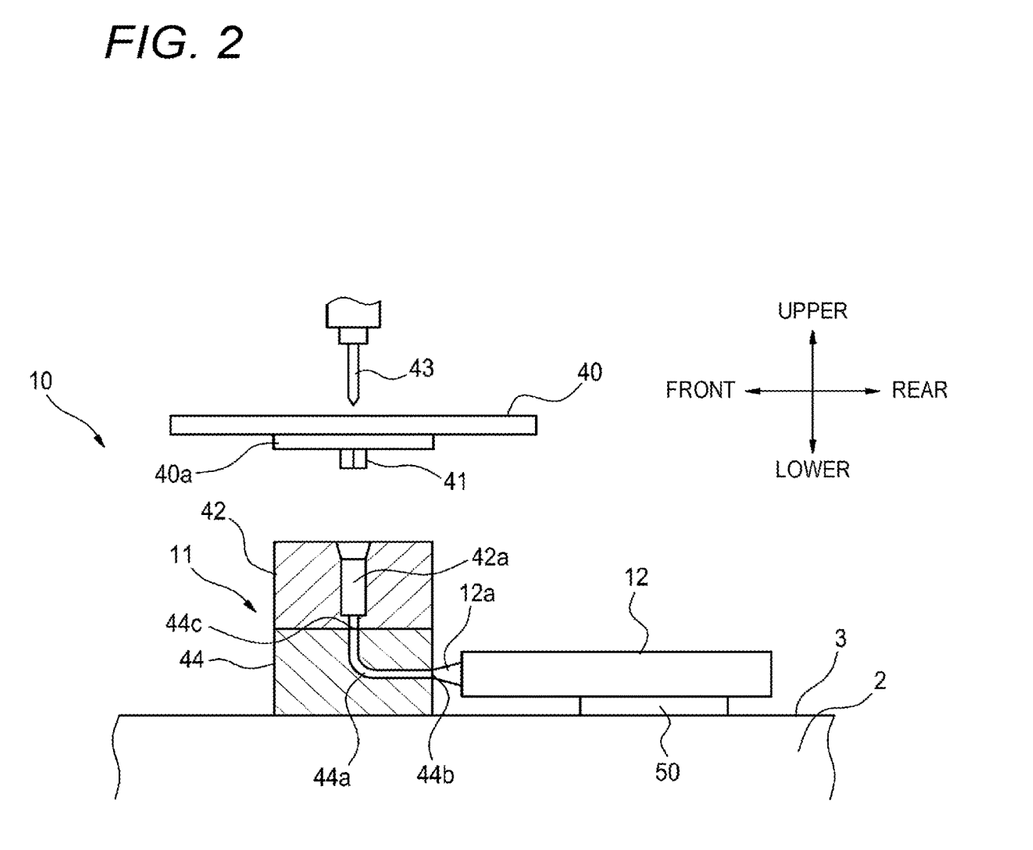
FIG. 2 is a schematic side view of an injection molding unit according to the present embodiment.

As shown in FIG. 2, the preform mold 11 and the injection device 12 configuring the injection molding unit 10 are provided on a machine table 2.

The preform mold 11 includes the neck mold 41 for forming a mouth portion of a preform, a cavity mold 42 for forming an outer shape of a body of the preform, a core mold 43 for forming an inner shape of the preform, and a hot runner block 44 for guiding molten resin to the cavity mold 42.

The neck mold 41 is provided to a fixed plate portion 40*a* of the transfer plate 40. The preform manufactured by the injection molding unit 10 or the container manufactured by the blow molding unit 20 is transferred to each processing unit by the transfer plate 40 of the transport mechanism 30 while its mouth portion is supported by the neck mold 41.

The core mold 43 is inserted into a hole portion (not shown) formed in the transfer plate 40 from above and inserted into a cavity 42*a* of the cavity mold 42. The cavity mold 42 is supported on the upper portion of the hot runner block 44. The hot runner block 44 has a flow passage 44*a*.

One end 44*b* of the flow passage 44*a* is a hole for resin injection, and a nozzle 12*a* of the injection device 12 for discharging the resin is connected to this hole. The other end 44*c* side of the flow passage 44*a* is in communication with the cavity 42*a* of the cavity mold 42. The hot runner block 44 guides the molten resin supplied from the nozzle 12*a* of the injection device 12 into the cavity 42*a* of the cavity mold 42 of the preform mold 11 in a mold clamped state through the flow passage 44*a*.

Figure 3:
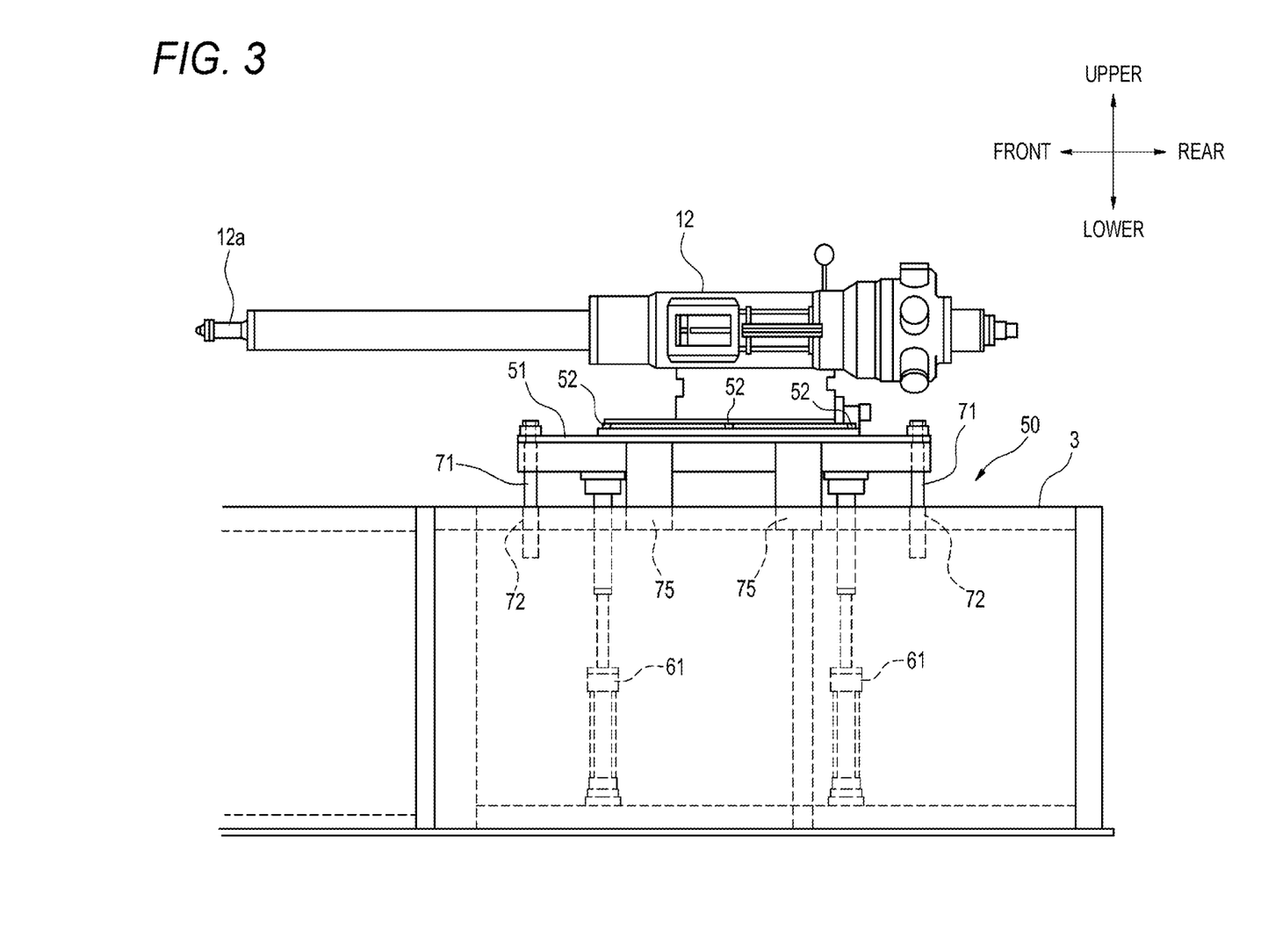
FIG. 3 is a side view of an injection device of the injection molding unit.

As shown in FIGS. 2 and 3, the injection molding unit 10 includes a position adjustment mechanism 50 on which the injection device 12 is supported. The position adjustment mechanism 50 is provided on the machine table 2. The position adjustment mechanism 50 has a support plate 51, and the injection device 12 is fixed to the upper surface of the support plate 51 so as to be movable back and forth in the direction of the preform mold 11.

The position adjustment mechanism 50 is configured to lift and lower the support plate 51. In this way, the support plate 51 is lifted and lowered with respect to an upper surface plate 3 of the machine table 2, and the position of the injection device 12 fixed to the support plate 51 in the upper and lower direction is adjusted. Further, a height fine-adjustment mechanism 52 is provided between the injection device 12 and the support plate 51. The height fine-adjustment mechanism 52 is, for example, a screw-type height adjustment pin and finely adjusts the position of the injection device 12 in the upper and lower direction with respect to the support plate 51.

Subsequently, the position adjustment mechanism 50 will be described in detail.

Figure 4:
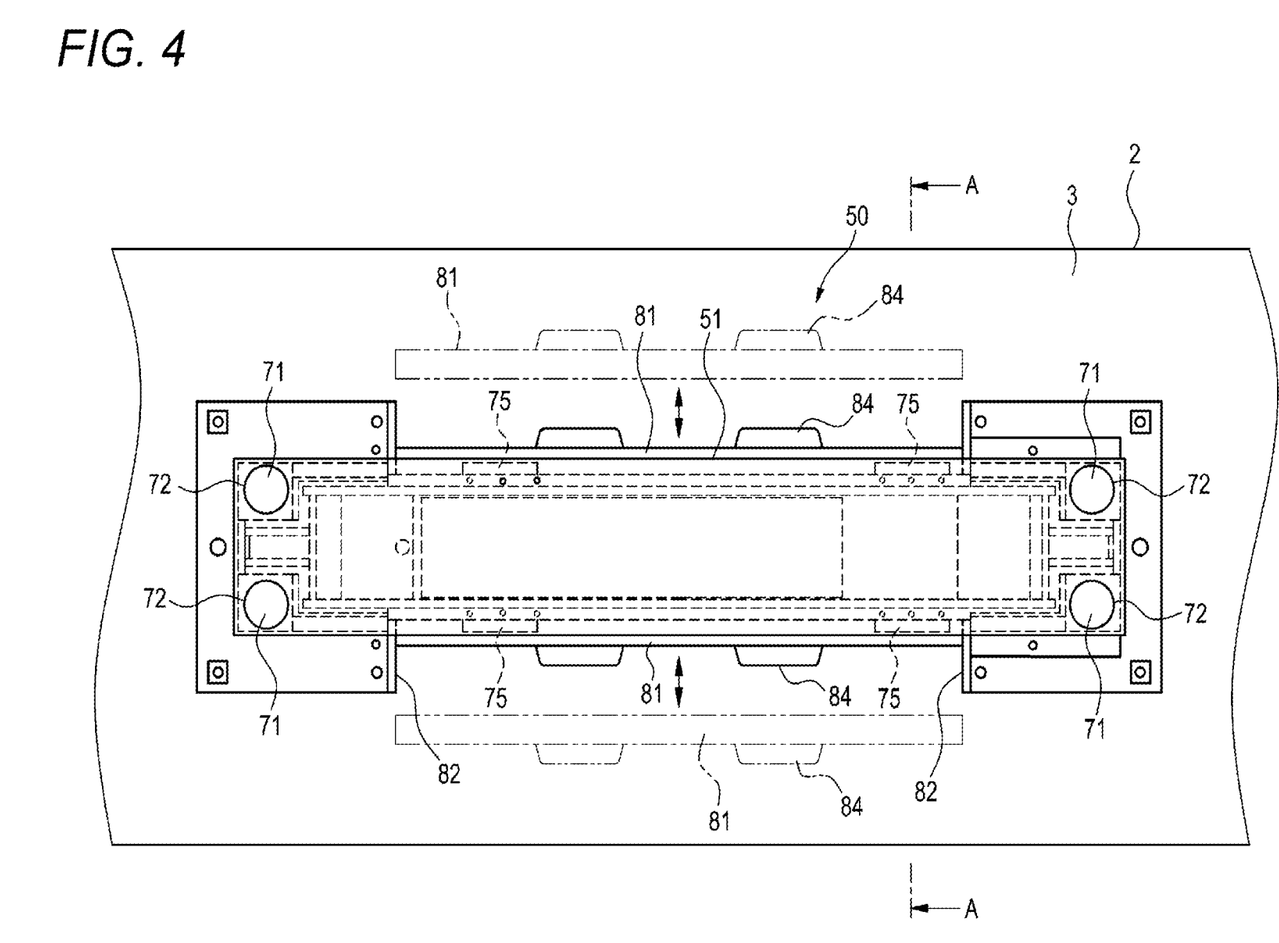
FIG. 4 is a plan view of a position adjustment mechanism.
Figure 5:
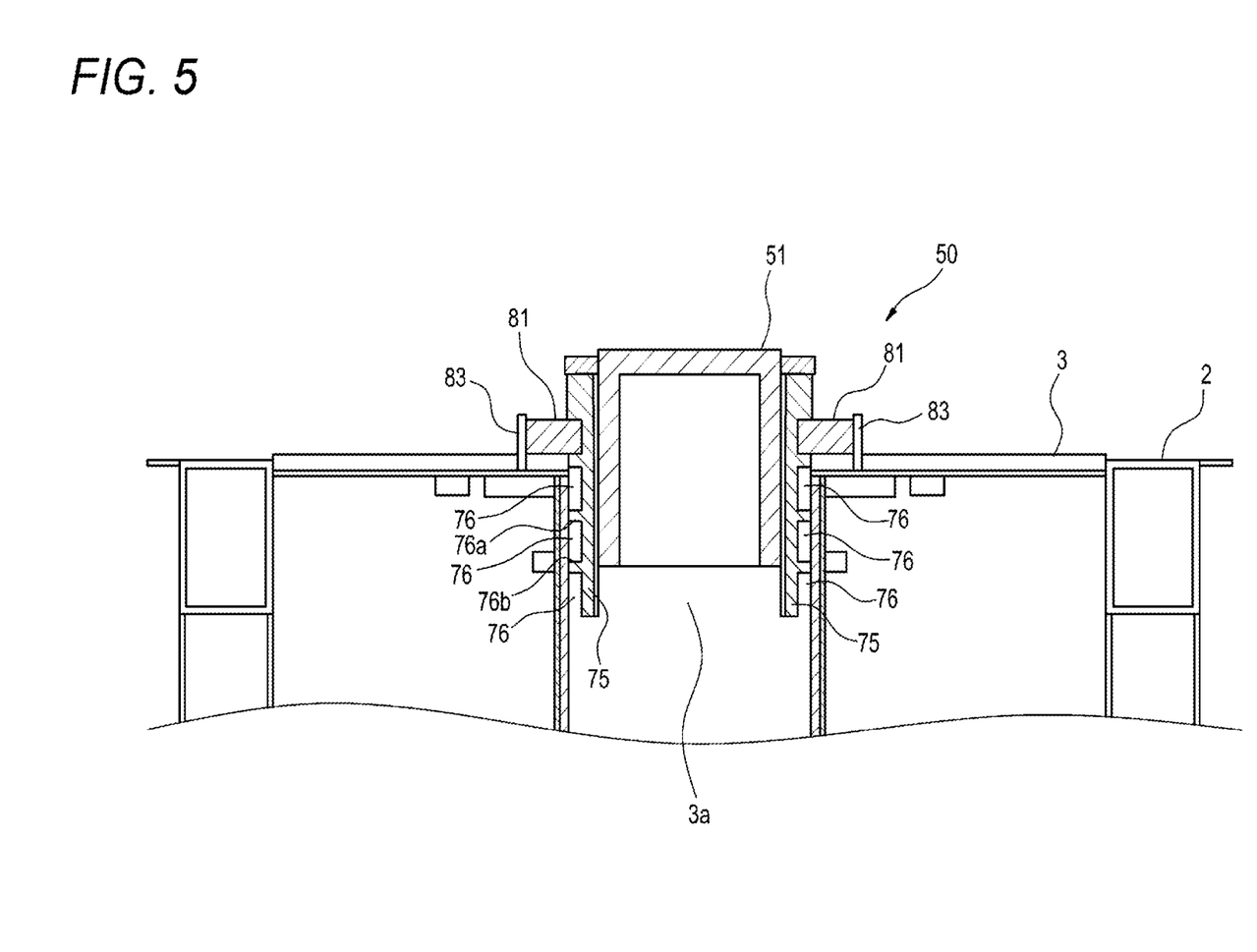
FIG. 5 is a sectional view taken along the line A-A in FIG. 4 in a state where a support plate is disposed at the lowermost position.
Figure 6:
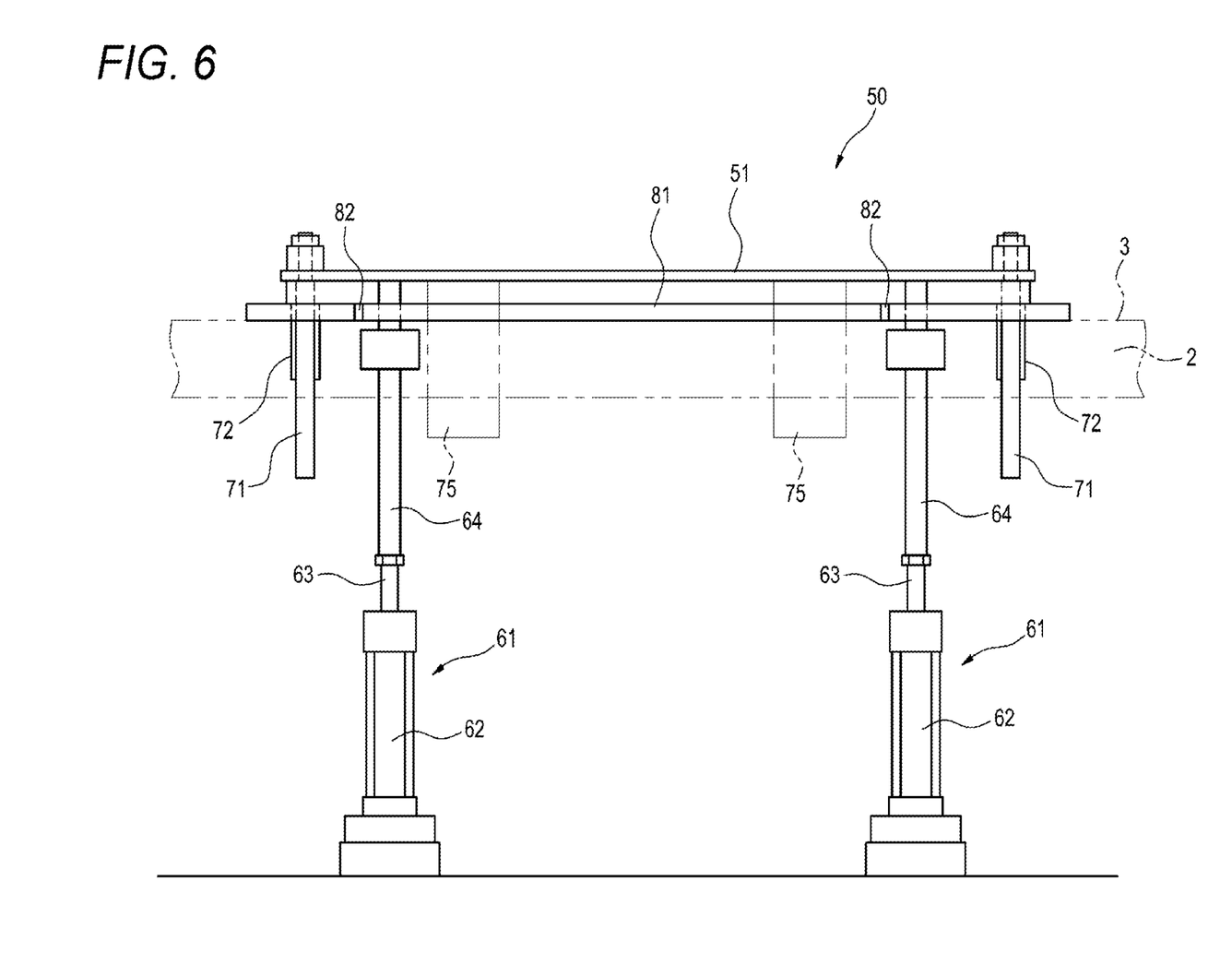
FIG. 6 is a side view of the position adjustment mechanism in a state where the support plate is disposed at the lowermost position.

As shown in FIGS. 4 and 5, an opening portion 3*a* is formed in the upper surface plate 3 of the machine table 2, and the support plate 51 provided with the position adjustment mechanism 50 is disposed in the opening portion 3*a* of the upper surface plate 3 in a plan view. As shown in FIG. 6, the position adjustment mechanism 50 includes at least one, preferably, a pair of (two) hydraulic cylinders (lifting and lowering mechanism such as a linear motion actuator) 61 arranged in a vertical direction. Each of the hydraulic cylinders 61 has a cylinder body 62 and a rod 63 provided at an upper portion of the cylinder body 62. The rod 63 moves back and forth with respect to the cylinder body 62 by hydraulic pressure. One end of a connecting member 64 is connected to the rod 63 of the hydraulic cylinder 61. The other end of the connecting member 64 is connected to the support plate 51. In this way, as the rod 63 of the hydraulic cylinder 61 moves back and forth, the support plate 51 is lifted and lowered.

Guide rods 71 extending downward are provided at four corners of the support plate 51. These guide rods 71 are slidably inserted through guide cylinders 72 provided on the upper surface plate 3 of the machine table 2. When the support plate 51 is lifted and lowered, the guide rods 71 are guided in the upper and lower direction by the guide cylinders 72. In this way, the support plate 51 is lifted and lowered while maintaining its posture parallel to the upper surface plate 3.

At least one, preferably, two or more locking blocks 75 are fixed to both side portions along a longitudinal direction of the support plate 51, respectively. When two or more locking blocks 75 are used, the locking blocks 75 are spaced apart from each other. Each of the locking blocks 75 has a plurality of locking recesses 76 on the outer surface side which is the side opposite to the support plate 51. These locking recesses 76 are arranged in a plurality of stages in the upper and lower direction and formed to extend in the horizontal direction. Each locking recess 76 has an upper wall surface 76a and a lower wall surface 76b. Meanwhile, the lowermost locking recess 76 is opened at the lower side and has only the upper wall surface 76a.

At least two locking plates 81 are provided on the upper surface plate 3 of the machine table 2. The locking plates 81 are disposed at both side portions along the longitudinal direction of the support plate 51. The locking plates 81 are arranged between a pair of guide plates 82 fixed to an upper surface of the upper surface plate 3 and are slidable in a direction approaching and separating from the support plate 51. Further, a gripping portion 84 may be provided in each locking plate 81 so as to facilitate the sliding operation. When these locking plates 81 are slid in a direction approaching the support plate 51, each locking plate 81 can be fitted into any one of the locking recesses 76 of the locking block 75. The upper wall surface 76a of the locking recess 76 is placed on and abuts against the locking plate 81 fitted into the locking recess 76. In this way, the load of the support plate 51 on which the injection device 12 is mounted is applied to the machine table 2 via the locking plates 81.

Further, in a state where the locking plates 81 are fitted into the locking recesses 76 of the locking blocks 75, fixing pins 83 fixed to the side opposite to the support plate 51 are provided on the upper surface plate 3. Further, by fixing the fixing pins 83 to the upper surface plate 3, the movement of the locking plates 81 in a direction separating from the support plate 51 is restricted and the fitted state of the locking plates 81 to the locking recesses 76 is maintained.

Figure 7:
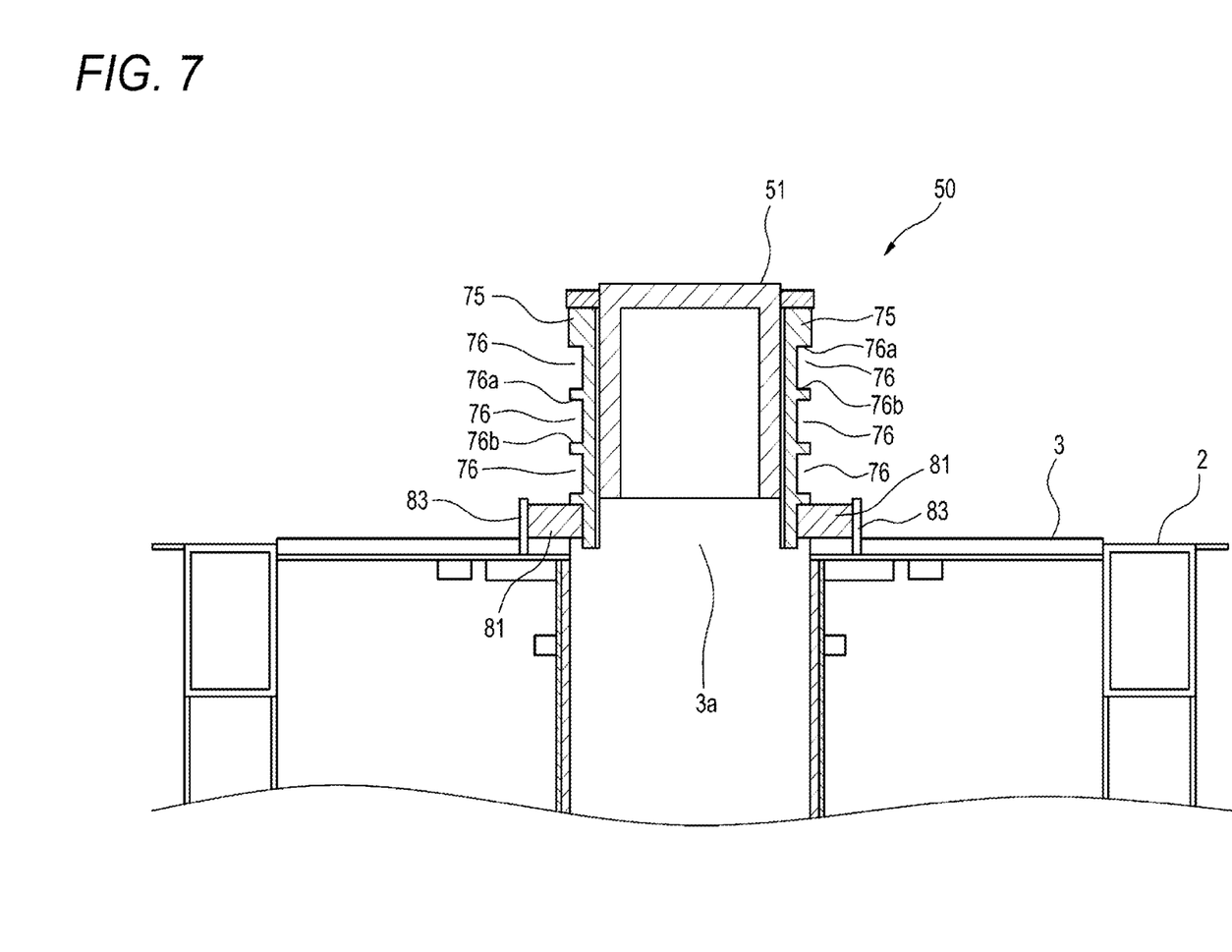
FIG. 7 is a sectional view taken along the line A-A in FIG. 4 in a state where the support plate is disposed at the uppermost position.
Figure 8:
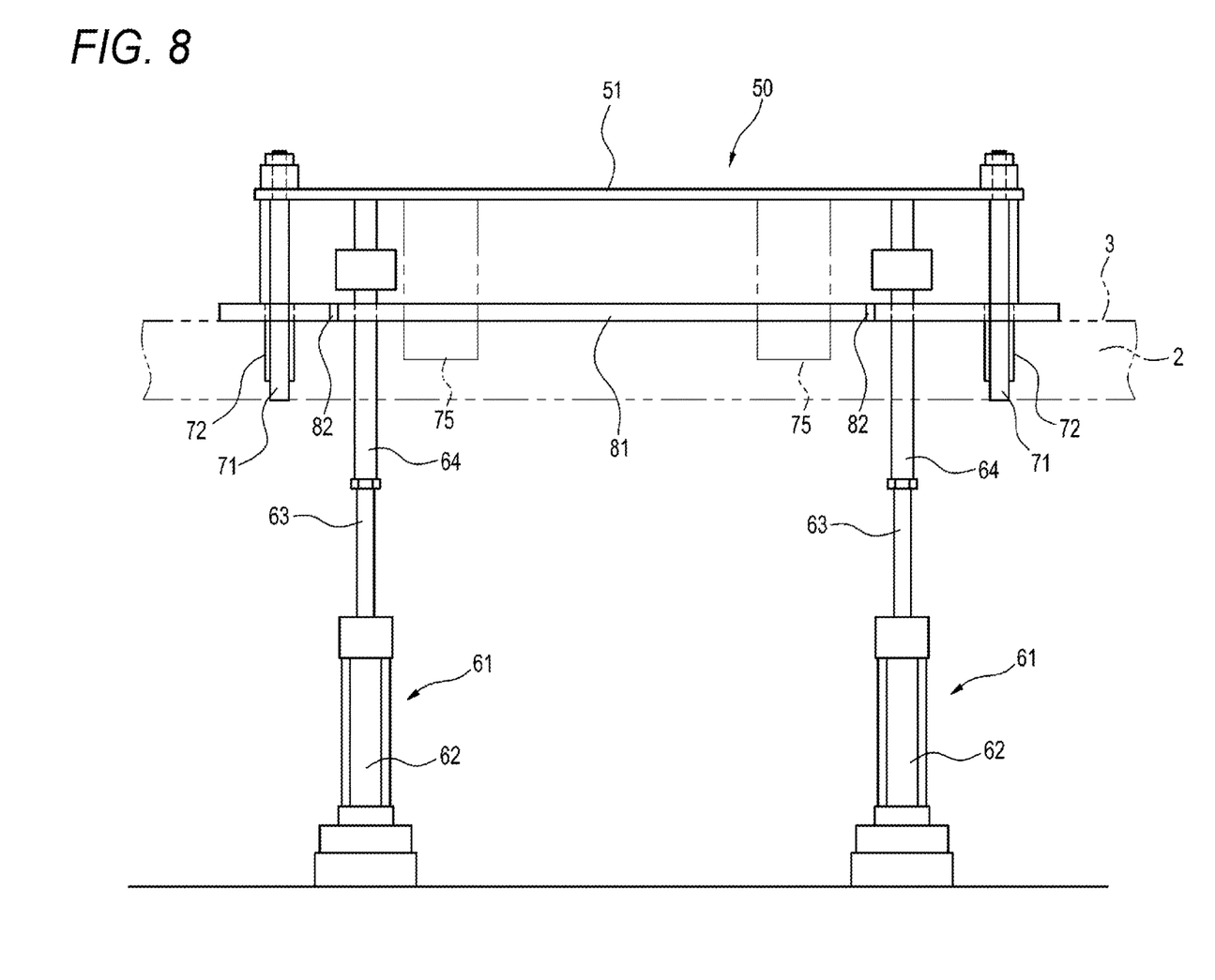
FIG. 8 is a side view of the position adjustment mechanism in a state where the support plate is disposed at the uppermost position.

Here, in the position adjustment mechanism 50, the support plate 51 is located at the lowermost position in a state (see FIGS. 5 and 6) where the locking plates 81 are fitted into the uppermost locking recesses 76 of the locking blocks 75. When the locking recesses 76 into which the locking plates 81 are fitted are changed to the lower locking recesses 76 from the lowermost position state, the position of the support plate 51 is set to be higher step by step. Further, as shown in FIGS. 7 and 8, the support plate 51 is located at the uppermost position in a state where the locking plates 81 are fitted into the lowermost locking recesses 76 of the locking blocks 75.

Subsequently, the process of molding a preform 5 in the injection molding unit 10 will be described.

Figure 9:
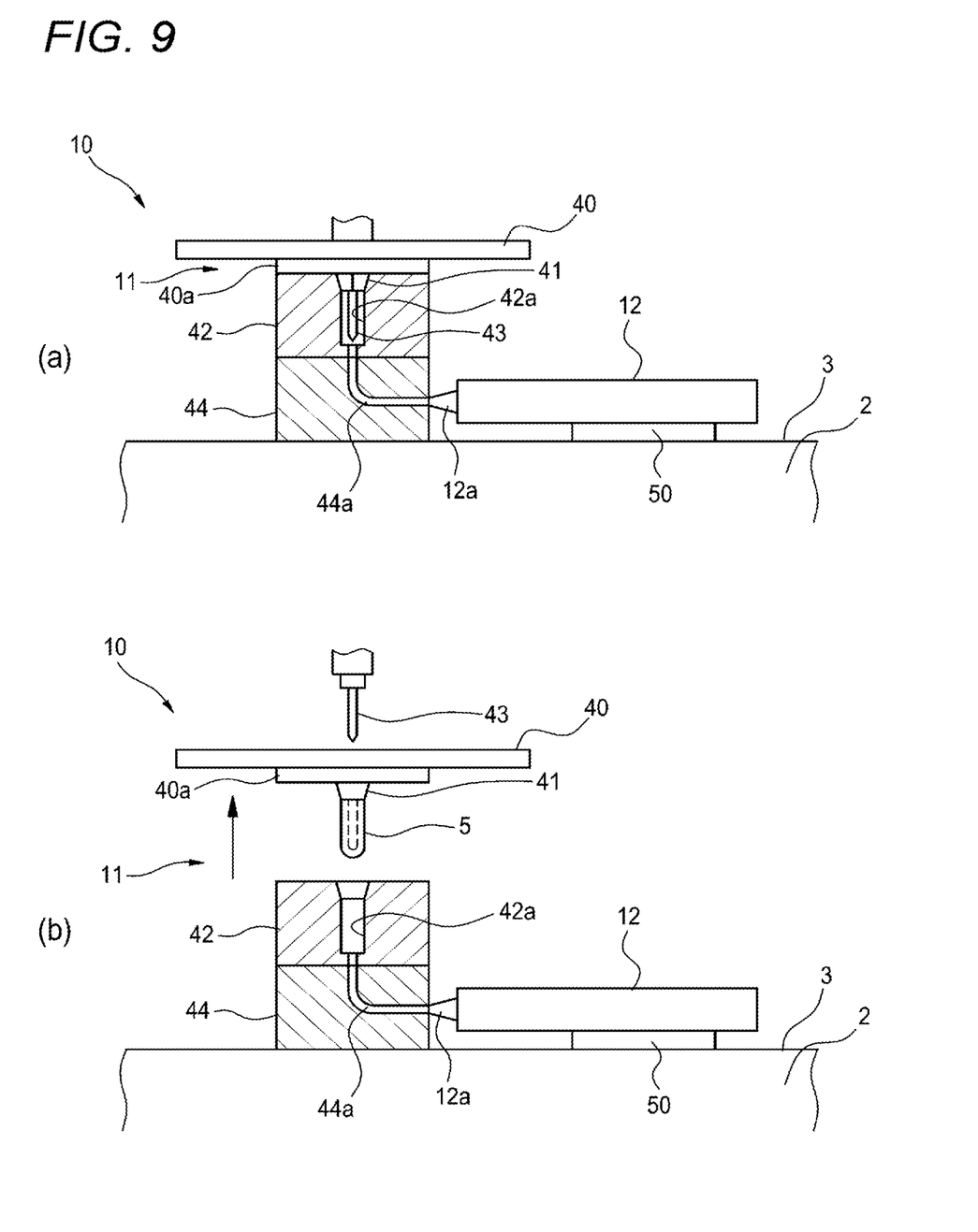
FIG. 9 is a view for explaining a preform molding process by the injection molding unit. In which (a) is a schematic side view of the injection molding unit in a mold-clamped state, and (b) is a schematic side view of the injection molding unit in a mold-opened state.

As shown in (a) of FIG. 9, in the injection molding unit 10, first, the preform mold 11 is clamped. Specifically, as the transfer plate 40 is lowered, the neck mold 41 is fitted into the cavity 42a of the cavity mold 42. Further, as the core mold 43 is lowered, the core mold 43 is inserted into the hole portion formed in the transfer plate 40 from above and inserted into the cavity 42a of the cavity mold 42.

In a state where the preform mold 11 is clamped, molten resin is sent from the injection device 12 to the flow passage 44a of the hot runner block 44. Then, the molten resin passes through the flow passage 44a of the hot runner block 44 and is filled in the cavity 42a of the cavity mold 42 in which the neck mold 41 and the core mold 43 are disposed.

Subsequently, in the injection molding unit 10, as shown in (b) of FIG. 9, the transfer plate 40 and the core mold 43 are lifted after the resin is cured, and the preform mold 11 is in a mold-opened state. At this time, the preform 5 held by the neck mold 41 is extracted from the cavity mold 42.

Thereafter, the transfer plate 40 is rotated at predetermined angular intervals in the horizontal direction by the transport mechanism 30. In this way, the preform 5 held by the neck mold 41 is sequentially transported to the temperature control unit 15, the blow molding unit 20 and the take-out unit 25, and the processing in each processing unit is performed. In this way, a container such as a blow-molded PET bottle can be obtained.

Figure 10:
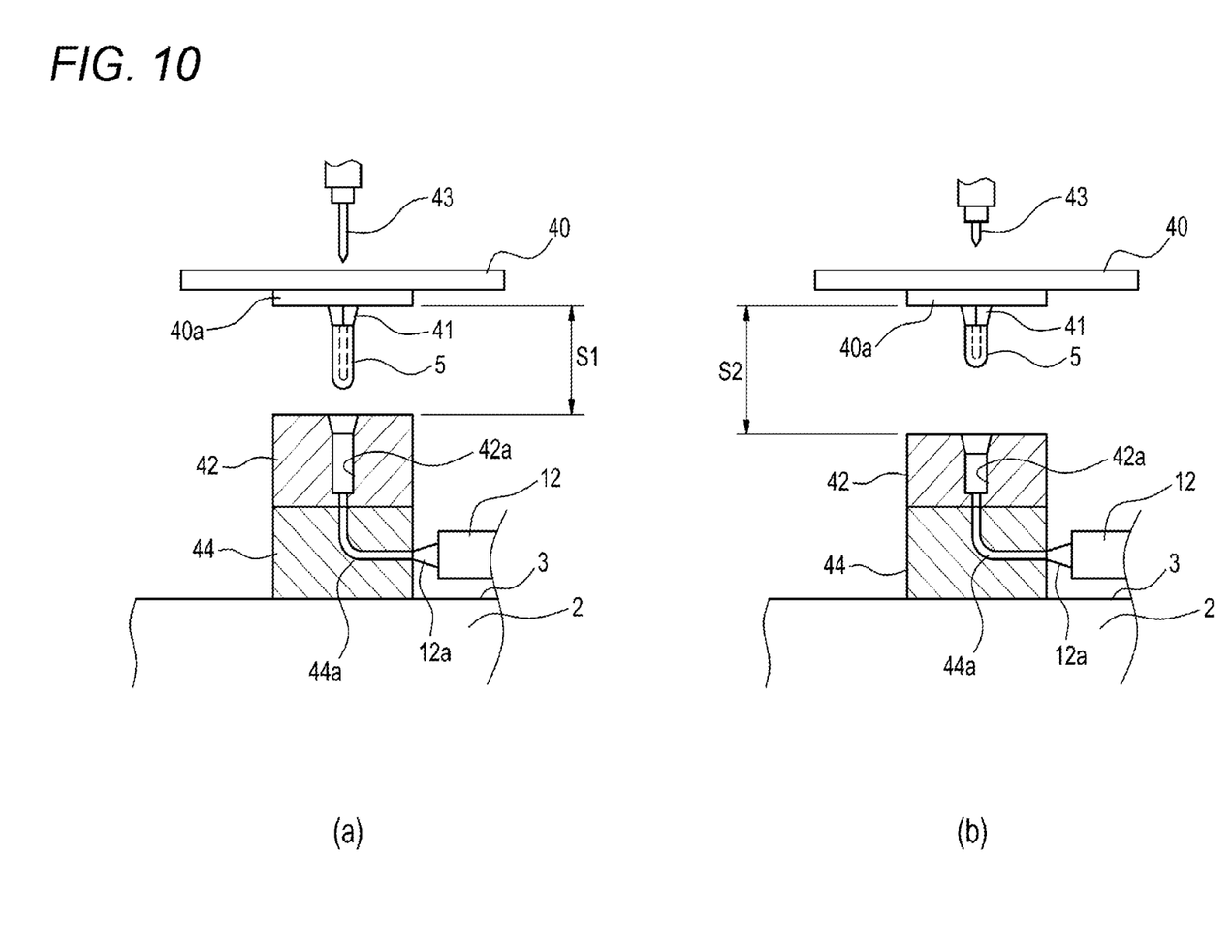
FIG. 10 is a view for explaining a stroke of a transfer plate, in which (a) is a schematic side view of the injection molding unit having a cavity mold for a large-size preform, and (b) is a schematic side view of the injection molding unit having a cavity mold for a small-size preform.

Here, in the injection molding unit 10, for example, when molding containers of different sizes, it is necessary to replace the cavity mold 42 of the preform mold 11 with a cavity mold for a preform of another size. For example, in the case of molding the small-size preform 5 as shown in (b) of FIG. 10 from the state corresponding to the molding of the large-size preform 5 as shown in (a) of FIG. 10, the cavity mold 42 is replaced with the cavity mold 42 having a small thickness for molding the small-size preform 5.

Meanwhile, the distance of the movement stroke of the transfer plate 40 during the mold-clamping and the mold-opening is sufficient as long as the transfer plate 40 can be lifted and the preform 5 can be pulled out from the cavity mold 42 and rotated. For example, when molding the large-size preform 5 as shown in (a) of FIG. 10, the movement stroke of the transfer plate 40 is set as a movement stroke S1 in which a slight gap is formed between the lower end of the preform 5 and the upper surface of the cavity mold 42. On the contrary, since the cavity mold 42 for molding the small-size preform 5 has a small thickness, an unnecessarily large gap is formed between the lower end of the preform 5 and the upper surface of the cavity mold 42, as shown in (b) of FIG. 10. That is, there is a possibility that a movement stroke S2 becomes unnecessarily large and a molding cycle is degraded.

Therefore, in the present embodiment, when replacing the cavity mold 42, the height adjustment for optimizing the stroke so as to minimize the movement stroke of the transfer plate 40 during the mold-clamping and the mold-opening is performed.

Hereinafter, the height adjustment will be described. Here, the height adjustment in the case where the blow molding machine 1 is caused to correspond to the molding of the small-size preform 5 from the state corresponding to the molding of the large-size preform 5 will be described.

Figure 11:
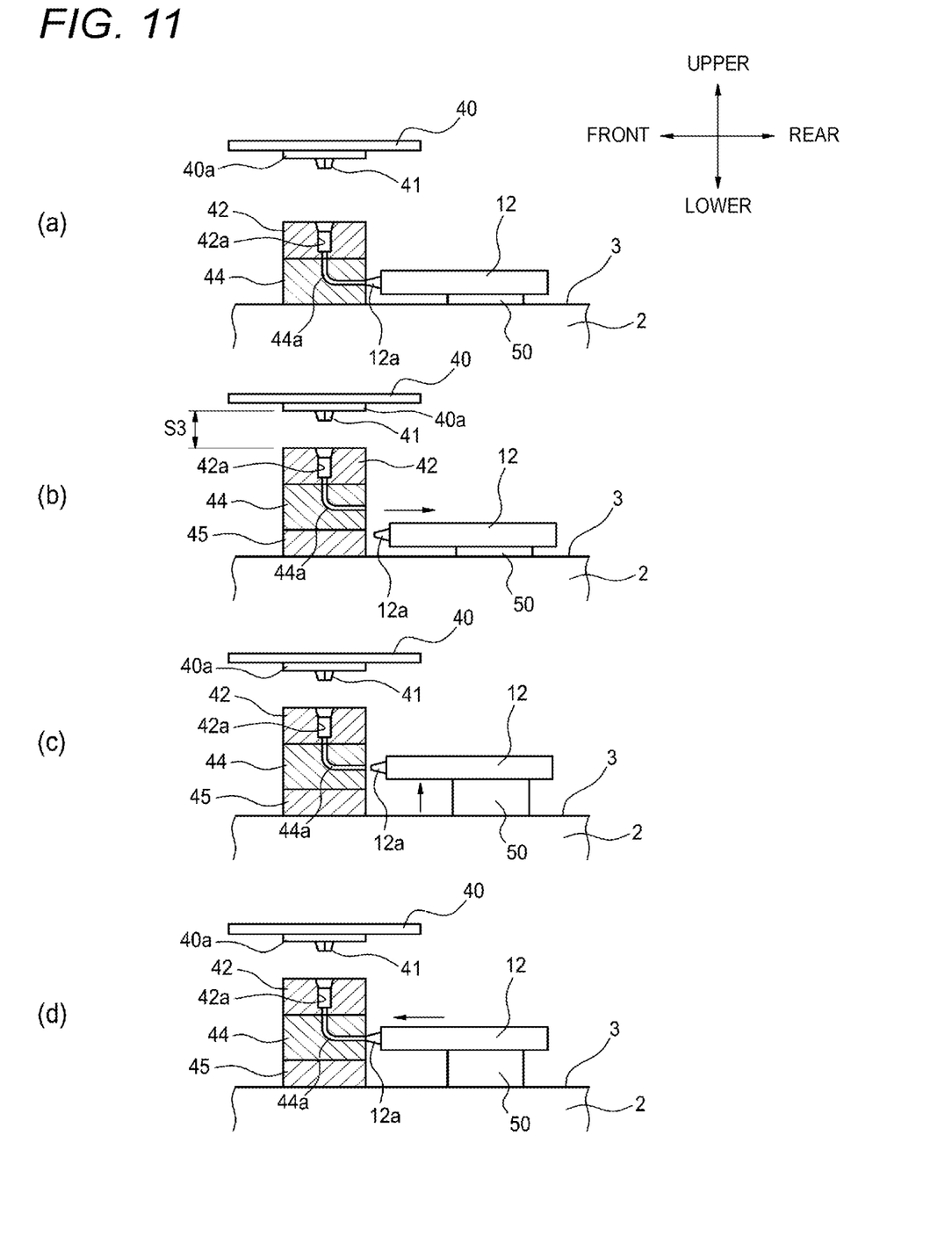
FIG. 11 is a view for explaining a procedure of an operation of replacing a preform mold, in which (a) to (d) are schematic side views of the injection molding unit, respectively.

When the cavity mold 42 is replaced with the cavity mold 42 for molding the small-size preform 5 as shown in (a) of FIG. 11, a spacer 45 is inserted under the hot runner block 44, and the height position of the cavity mold 42 is adjusted so that a movement stroke S3 of the transfer plate 40 during the mold-clamping and the mold-opening is set to a minimum size in which a slight gap is formed between the lower end of the small-size preform 5 and the cavity mold 42 during the mold-opening, as shown in (b) of FIG. 11. At this time, the injection device 12 is retreated and separated from the preform mold 11.

The height adjustment by the position adjustment mechanism 50 is performed. In order to perform the height adjustment by the position adjustment mechanism 50, first, the fixing pins 83 are removed and the locking plates 81 are slid in a direction away from the locking blocks 75. In this way, the locking plates 81 are pulled out from the locking recesses 76 of the locking blocks 75. Subsequently, as shown in (c) of FIG. 11, the rods 63 of the hydraulic cylinders 61 are caused to protrude by hydraulic pressure to lift the support plate 51, and the position of the nozzle 12a of the injection device 12 in the upper and lower direction is aligned with the resin injection hole of the flow passage 44a of the hot runner block 44. Subsequently, the locking plates 81 are slid in a direction approaching the support plate 51 and are fitted to the locking recesses 76 of the locking blocks 75, thereby fixing the fixing pins 83 to the upper surface plate 3. Thereafter, the rods 63 of the hydraulic cylinders 61 are slightly pulled in, and the upper wall surfaces 76a of the locking recesses 76 are placed on and abut against the locking plates 81 fitted to the locking recesses 76.

After the height adjustment by the position adjustment mechanism 50, the position of the injection device 12 in the upper and lower direction with respect to the support plate 51 is finely adjusted by the height fine-adjustment mechanism 52, and the height position of the nozzle 12a of the injection device 12 is made to coincide with the height of the resin injection hole of the flow passage 44a of the hot runner block 44.

As shown in (d) of FIG. 11, the injection device 12 is made to advance and approach the preform mold 11, and the nozzle 12a of the injection device 12 is connected to the flow passage 44a of the hot runner block 44.

In this manner, according to the injection molding unit 10 of the present embodiment and the blow molding machine 1 including the same, the position of the injection device 12 in the upper and lower direction can be adjusted by the position adjustment mechanism 50. Therefore, it is possible to eliminate the need for a large-scale work such as lifting the injection device 12 with a crane or the like and inserting a spacer under the injection device 12 in order to adjust the heights of the resin injection hole of the flow passage 44a of the hot runner block 44 and the nozzle 12a of the injection device 12 for discharging the resin. That is, the heights of the hole of the flow passage 44a of the hot runner block 44 and the nozzle 12a of the injection device 12 can be adjusted by adjusting the position of the injection device 12 in the upper and lower direction in accordance with the change of the cavity mold 42 of the preform mold 11. In this way, it is possible to drastically reduce the labor and time involved in changeover when molding the different types of preforms 5.

Moreover, when adjusting the position of the injection device 12 in the upper and lower direction, the support plate 51 to which the injection device 12 is fixed is lifted and lowered by the hydraulic cylinders 61, and the locking plates 81 are selectively fitted to any one of the locking recesses 76 of the locking blocks 75. In this way, the position of the injection device 12 in the upper and lower direction can be adjusted in a step-by-step manner. As a result, the operation of adjusting the heights of the injection device 12 and the preform mold 11 can be easily performed.

Further, also in the blow molding machine 1 in which the transfer plates 40 are intermittently rotated and the preform 5 is processed in each processing unit, the setting at the time of changing the cavity mold 42 of the preform mold 11 can be optimally made without sacrificing the adjustment of the movement stroke of the transfer plates 40, thereby suppressing the degradation of the molding cycle.

Further, since the injection molding unit 10 includes, between the support plate 51 and the injection device 12, the height fine-adjustment mechanism 52 capable of adjusting the position of the injection device 12 in the upper and lower direction with respect to the support plate 51, the position of the injection device 12 in the upper and lower direction can be roughly adjusted by the position adjustment mechanism 50, and then, the position of the injection device 12 in the upper and lower direction can be finely adjusted by the height fine-adjustment mechanism 52. In this way, the heights of the hole of the flow passage 44a of the hot runner block 44 and the nozzle 12a of the injection device 12 can be adjusted with high accuracy.

Meanwhile, the disclosure is not limited to the above-described embodiments, but can be deformed and modified as appropriate. In addition, the material, shape, size, numerical value, form, number, arrangement location and the like of each part in the above-described embodiments are arbitrary and not limited, as long as they can achieve the disclosure.

Figure 12:
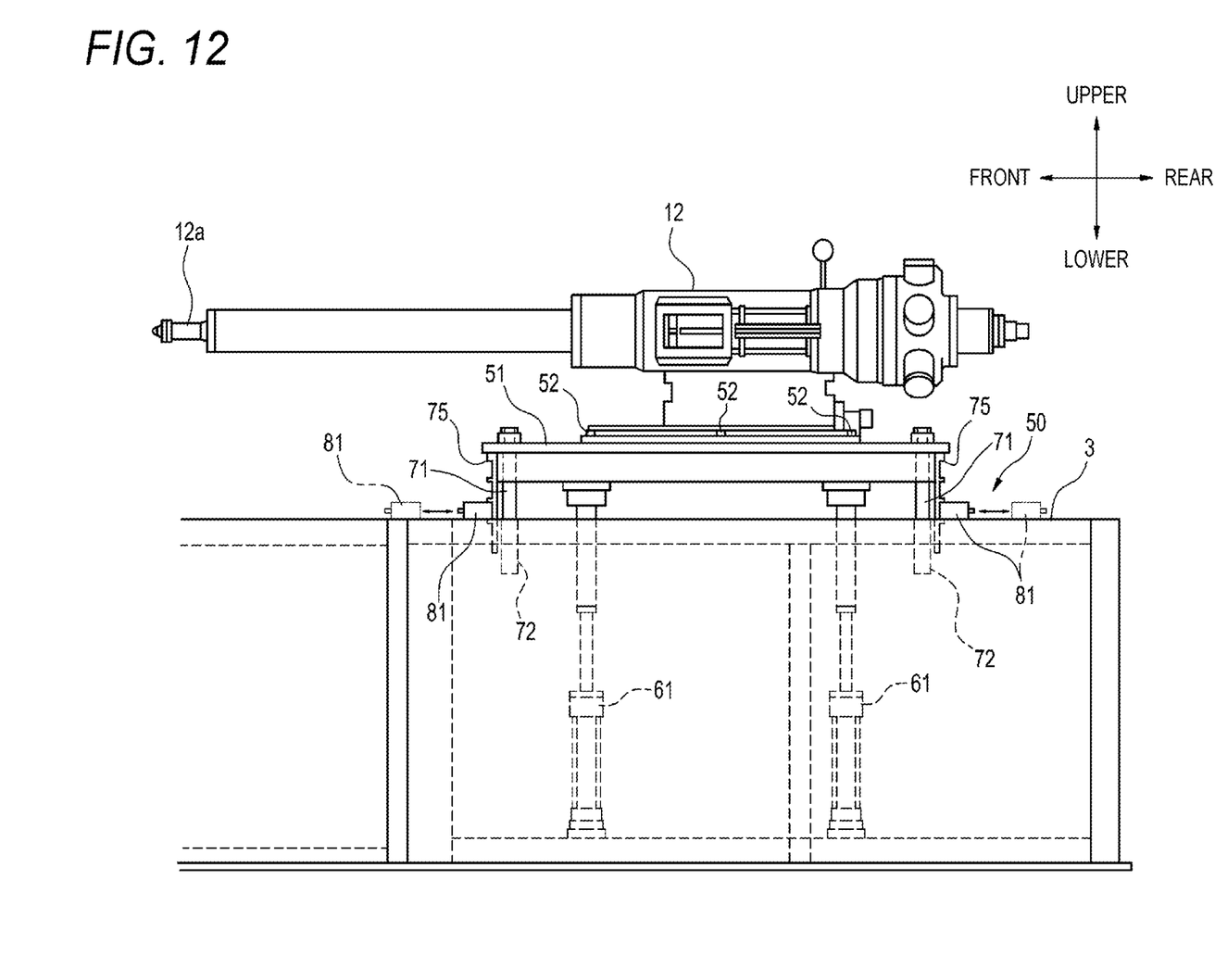
FIG. 12 is a side view of an injection device of an injection molding unit according to a modified example of the present embodiment.

For example, in the above-described embodiments, at least one, preferably, two or more locking blocks 75 are fixed to both side portions along the longitudinal direction of the support plate 51, respectively, and the locking plates 81 are arranged at both side portions along the longitudinal direction of the support plate 51. However, the disclosure is not limited to this embodiment. As shown in FIG. 12, at least one, preferably, two or more locking blocks 75 may be fixed to both side portions of the support plate 51 perpendicular to the longitudinal direction, respectively, and at least one, preferably, two or more locking plates 81 may be arranged at both side portions of the support plate 51 perpendicular to the longitudinal direction, respectively. In the case where a necessary member, for example, a power distribution cabinet or the like is arranged right beside the injection device 12, from the viewpoint of the working space, it is preferable that the locking blocks 75 are provided at both side portions of the support plate 51 perpendicular to the longitudinal direction and the locking plates 81 are arranged at both side portions of the support plate 51 perpendicular to the longitudinal direction.

As shown in FIG. 12, the locking plates 81 arranged at both side portions of the support plate 51 perpendicular to the longitudinal direction are slidable in a direction approaching and separating from the support plate 51. As the locking plates 81 are slid in a direction approaching the support plate 51, the locking plates 81 can be fitted to any one of the locking recesses 76 of the locking blocks 75. The upper wall surfaces 76a of the locking recesses 76 are placed on and abut against the locking plates 81 fitted to the locking recesses 76. In this way, the load of the support plate 51 on which the injection device 12 is mounted is applied to the machine table 2 via the locking plates 81.

The present application is based on Japanese Patent Application (Patent Application No. 2016-127010) filed on Jun. 27, 2016, the entirety of which is incorporated by reference. Further, all references cited herein are incorporated in their entirety.

REFERENCE NUMERALS LIST

1: Blow molding device, 2: Machine table, 5: Preform, 10: Injection molding unit, 11: Preform mold (Mold), 12: Injection device, 20: Blow molding unit, 30: Transport mechanism, 40: Transfer plate, 41: Neck mold, 42: Cavity mold, 50: Position adjustment mechanism, 51: Support plate, 52: Height fine-adjustment mechanism, 61: Hydraulic cylinder, 75: Locking block, 76: Locking recess, 81: Locking plate

What is claimed is:

1. A blow molding machine comprising:
an injection molding unit configured to manufacture a bottomed preform made of resin; and
a blow molding unit configured to manufacture a container by blow-molding the preform manufactured by the injection molding unit,
wherein the injection molding unit includes:
a mold configured to manufacture the preform; and
an injection device configured to supply resin which is a raw material to the mold,
wherein the injection device is fixed to a support plate,
wherein the support plate includes a position adjustment mechanism capable of adjusting a position of the injection device in an upper and lower direction with respect to the mold, and wherein the position adjustment mechanism includes:
a machine table;
a lifting and lowering mechanism configured to lift and lower the support plate with respect to the machine table;
a locking block fixed to the support plate and having locking recesses formed in a plurality of stages in the upper and lower direction and extending in a horizontal direction; and
a locking plate provided to the machine table and configured to be locked into and unlocked from any one of the locking recesses by being slid in a direction approaching and separating from the locking block.

2. The blow molding machine according to claim 1, further comprising:
a plurality of processing units including at least the injection molding unit and the blow molding unit, the plurality of processing units being arranged at a predetermined angular interval in the horizontal direction on the machine table;
a plurality of transfer plates arranged at a predetermined angular interval in the horizontal direction above the machine table;
a neck mold provided to the transfer plate and capable of gripping a preform molded by the injection molding unit; and
a transport mechanism configured to lift and lower the transfer plates at the processing units and intermittently rotate the transfer plates at a predetermined angular interval in the horizontal direction,
wherein the preform molded by the injection molding unit is pulled up from a cavity mold configuring the mold according to the lifting of the transfer plate by the transport mechanism and is sequentially transported to the processing units according to the intermittent rotation of the transfer plate at the predetermined angular interval in the horizontal direction by the transport mechanism.

* * * * *